US012457922B2

United States Patent
Peters et al.

(10) Patent No.: US 12,457,922 B2
(45) Date of Patent: Nov. 4, 2025

(54) LAWN CARE VEHICLE WITH HEADS UP MOWER CONTROLS

(71) Applicant: Husqvarna AB, Huskvarna (SE)

(72) Inventors: Frank Peters, Concord, NC (US); Christopher Van Buren, Charlotte, NC (US); Adam Schoonmaker, Monroe, NC (US); Sean Dwyer, Gastonia, NC (US)

(73) Assignee: HUSQVARNA AB, Huskvarna (SE)

( * ) Notice: Subject to any disclaimer, the term of this patent is extended or adjusted under 35 U.S.C. 154(b) by 922 days.

(21) Appl. No.: 17/613,878

(22) PCT Filed: Nov. 8, 2019

(86) PCT No.: PCT/IB2019/059619
§ 371 (c)(1),
(2) Date: Nov. 23, 2021

(87) PCT Pub. No.: WO2021/090050
PCT Pub. Date: May 14, 2021

(65) Prior Publication Data
US 2022/0232762 A1    Jul. 28, 2022

(51) Int. Cl.
*A01D 34/00* (2006.01)
*A01D 34/64* (2006.01)
(Continued)

(52) U.S. Cl.
CPC ........... *A01D 34/006* (2013.01); *A01D 34/64* (2013.01); *A01D 34/824* (2013.01); *A01D 34/74* (2013.01); *A01D 2101/00* (2013.01)

(58) Field of Classification Search
CPC .... A01D 34/006; A01D 34/64; A01D 34/824; A01D 34/74; A01D 34/69; A01D 69/03; A01D 69/00; B60K 35/00; B62D 1/12
See application file for complete search history.

(56) References Cited

U.S. PATENT DOCUMENTS

| 4,663,923 A | 5/1987 | Boice |
| 5,307,612 A | 5/1994 | Tomiyama et al. |
(Continued)

FOREIGN PATENT DOCUMENTS

| AU | 2011379996 B2 | 4/2016 |
| CN | 1613681 A | 5/2005 |
(Continued)

OTHER PUBLICATIONS

International Search Report and Written Opinion for International Application No. PCT/IB2019/059619 mailed Jul. 8, 2020.

*Primary Examiner* — Joseph M Rocca
*Assistant Examiner* — Robert E Pezzuto
(74) *Attorney, Agent, or Firm* — Burr & Forman (57) ABSTRACT

A riding lawn care vehicle may include a frame to which at least a first drive wheel and a second drive wheel of the riding lawn care vehicle are attachable, an engine operably coupled to the frame and the first and second drive wheels to provide power to the first and second drive wheels, a steering assembly that includes a first steering lever and a second steering lever, and a work assembly. The first and second steering levers are operably coupled to the first and second drive wheels respectively to facilitate turning of the riding lawn care vehicle based on drive speed control of the first and second drive wheels responsive to positioning of the first and second steering levers. The work assembly is operably coupled to the engine to perform a work function responsive to power received from the engine. Each of the first and second steering levers includes a grip portion. At least one of the first steering lever or the second steering lever includes a control module disposed proximate to and separate from the grip portion. The control module includes a control operator configured to control operation of the engine or the work assembly.

20 Claims, 8 Drawing Sheets

(51) Int. Cl.
  *A01D 34/82* (2006.01)
  *A01D 69/00* (2006.01)
  *A01D 34/74* (2006.01)
  *A01D 101/00* (2006.01)

(56) References Cited

U.S. PATENT DOCUMENTS

| | | | |
|---|---|---|---|
| 5,355,661 A | 10/1994 | Tomiyama | |
| 6,026,634 A | 2/2000 | Peter et al. | |
| 6,434,917 B1 | 8/2002 | Bartel | |
| 6,530,200 B1* | 3/2003 | Minoura | A01D 34/64 56/15.2 |
| 6,729,115 B2 | 5/2004 | Bartel | |
| 7,172,041 B2 | 2/2007 | Wuertz et al. | |
| 7,430,847 B2* | 10/2008 | Hoffman | A01D 69/03 56/10.8 |
| 7,476,059 B1 | 1/2009 | Holland | |
| 7,708,091 B2 | 5/2010 | Osborne | |
| 7,954,573 B2 | 6/2011 | Jessen | |
| 8,033,354 B2 | 10/2011 | Marshall et al. | |
| 8,607,901 B1 | 12/2013 | Depauw | |
| 9,516,809 B2 | 12/2016 | Wright et al. | |
| 9,867,331 B1* | 1/2018 | Siudyla | B62D 11/04 |
| 10,293,853 B2 | 5/2019 | Koike et al. | |
| 2004/0050026 A1 | 3/2004 | Stover et al. | |
| 2004/0129486 A1 | 7/2004 | Chernoff et al. | |
| 2006/0175098 A1 | 8/2006 | Sutherland | |
| 2007/0095040 A1 | 5/2007 | Berkeley | |
| 2007/0163221 A1 | 7/2007 | Foster | |
| 2008/0209877 A1 | 9/2008 | Turner et al. | |
| 2009/0064650 A1 | 3/2009 | Eberle et al. | |
| 2009/0201650 A1 | 8/2009 | Hauser et al. | |
| 2014/0173946 A1 | 6/2014 | Gerrits et al. | |
| 2015/0007541 A1 | 1/2015 | Albinger et al. | |
| 2017/0120922 A1 | 5/2017 | Schaedler et al. | |
| 2021/0029871 A1* | 2/2021 | Brandt | A01D 34/86 |
| 2021/0037701 A1* | 2/2021 | Kaskawitz | G05B 19/4155 |

FOREIGN PATENT DOCUMENTS

| | | |
|---|---|---|
| CN | 103747998 A | 4/2014 |
| CN | 104270936 A | 1/2015 |
| CN | 105850340 A | 8/2016 |
| CN | 205872175 U | 1/2017 |
| CN | 109310050 A | 2/2019 |
| EP | 0825627 B1 | 7/2002 |
| EP | 1955580 A1 | 8/2008 |
| GB | 2246021 A | 1/1992 |
| WO | 2010077198 | 7/2010 |
| WO | 2013002780 A1 | 1/2013 |
| WO | 2019035021 A1 | 2/2019 |
| WO | 2019082149 A1 | 5/2019 |

* cited by examiner

LAWN CARE VEHICLE WITH HEADS UP MOWER CONTROLS

TECHNICAL FIELD

Example embodiments generally relate to lawn care vehicles and, more particularly, to a riding lawn care vehicle with controls that are provided on the steering levers of the vehicle.

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines, and are relatively inexpensive. Meanwhile, at the other end of the spectrum, riding lawn mowers, such as lawn tractors, can be quite large. Riding lawn mowers can sometimes also be configured with various functional accessories (e.g., trailers, tillers, and/or the like) in addition to grass cutting components. Riding lawn mowers provide the convenience of a riding vehicle as well as a typically larger cutting deck as compared to a walk-behind model.

Some riding lawn mowers have been provided with very short (e.g., near zero) turning radiuses. Such mowers have employed separate steering levers that each allow individual control of a corresponding drive wheel on the same side of the mower. The drive wheels are generally rear wheels, and wheels at the front of the mower tend to be caster wheels that can freely rotate about an axis perpendicular to the ground in order to support movement in any direction, and the tight turning radiuses that can be achieved with such mowers. The operator either pulls or pushes the steering levers from a neutral (middle) position with hands that are generally out in front of the operator on the steering levers during operation.

This operational paradigm (i.e., having the operator's hands out in front of him/her on the steering levers) generally creates an intuitive and comfortable control environment where the operator's hands and the steering levers are both within the normal field of view of the operator (i.e., in front of the vehicle) while the vehicle is being navigated and controlled. However, there are a few situations where the operator is normally required to take his/her eyes away from the normal field of view due to the fact that many controls are located at other parts of the vehicle (e.g., at a console beside the seat). Particularly for controls that are hand operated, this means the operator may not only be looking away from the front of the vehicle (and looking instead for the specific control of interest), but may also mean that the operator has to take one hand off of a steering lever to operate the specific control of interest.

BRIEF SUMMARY OF SOME EXAMPLES

Some example embodiments of the present invention provide the ability to mount vehicle controls to a portion of the steering levers that does not interfere with the grips of the steering levers.

In one example embodiment, a riding lawn care vehicle is provided. The riding lawn care vehicle may include a frame to which at least a first drive wheel and a second drive wheel of the riding lawn care vehicle are attachable, an engine operably coupled to the frame and the first and second drive wheels to provide power to the first and second drive wheels, a steering assembly that includes a first steering lever and a second steering lever, and a work assembly. The first and second steering levers may be operably coupled to the first and second drive wheels respectively to facilitate turning of the riding lawn care vehicle based on drive speed control of the first and second drive wheels responsive to positioning of the first and second steering levers. The work assembly may be operably coupled to the engine to perform a work function responsive to power received from the engine. Each of the first and second steering levers may include a grip portion. At least one of the first steering lever or the second steering lever may include a control module disposed proximate to and separate from the grip portion. The control module may include a control operator configured to control operation of the engine or the work assembly.

In another example embodiment, a control module configured to be disposed at least one of a first steering lever or a second steering lever of a riding lawn care vehicle may be provided. The riding lawn care vehicle may include first and second drive wheels operably coupled to respective ones of the first and second steering levers to facilitate turning of the riding lawn care vehicle responsive to drive speed control of the first and second drive wheels based on positioning of the first and second steering levers, respectively. Each of the first and second steering levers may include a grip portion. The control module may include a housing and a lever interface operably coupled to the housing. The lever interface may be configured to be secured to the first steering lever or the second steering lever separate from and proximate to the grip portion. The control module may include a control operator configured to control operation of an engine or work assembly of the riding lawn care vehicle. The lever interface and the grip portion may be made of different materials.

Some example embodiments may improve an operator's ability to control or operate a lawn care vehicle. The user experience associated with operating the riding lawn care vehicle may therefore be improved.

BRIEF DESCRIPTION OF THE SEVERAL VIEWS OF THE DRAWING(S)

Having thus described some embodiments of the present invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, the phrase "operable coupling" and variants thereof should be understood to relate to direct or indirect connection that, in either case, enables functional interconnection of components that are operably coupled to each other.

As noted above, some example embodiments may improve the ability of an operator to control operation of a riding lawn care vehicles by eliminating the need to look away or take hands off of the steering levers during operation. This may make it both easier and safer to operate and control the riding lawn care vehicle. However, the concepts described herein for improving control of the riding lawn care vehicle may also have other benefits as well. In this regard, for example, the specific structures described herein are separate from the grip portion of the steering levers. Thus, rather than interfering with or requiring replacement of the grip portion of a steering lever, example embodiments have the potential for being added onto standard steering levers as an upgrade. This structural paradigm means that units can be designed at multiple price points or with different options without necessarily creating a need for different steering lever parts for each different unit. Instead, the same steering lever can either be included with the modular add-on of an example embodiment to the end thereof, or not. This saves cost and complexity over units that would require fully different steering levers for different models due to integration of controls into the grips themselves.

Figure 1A:
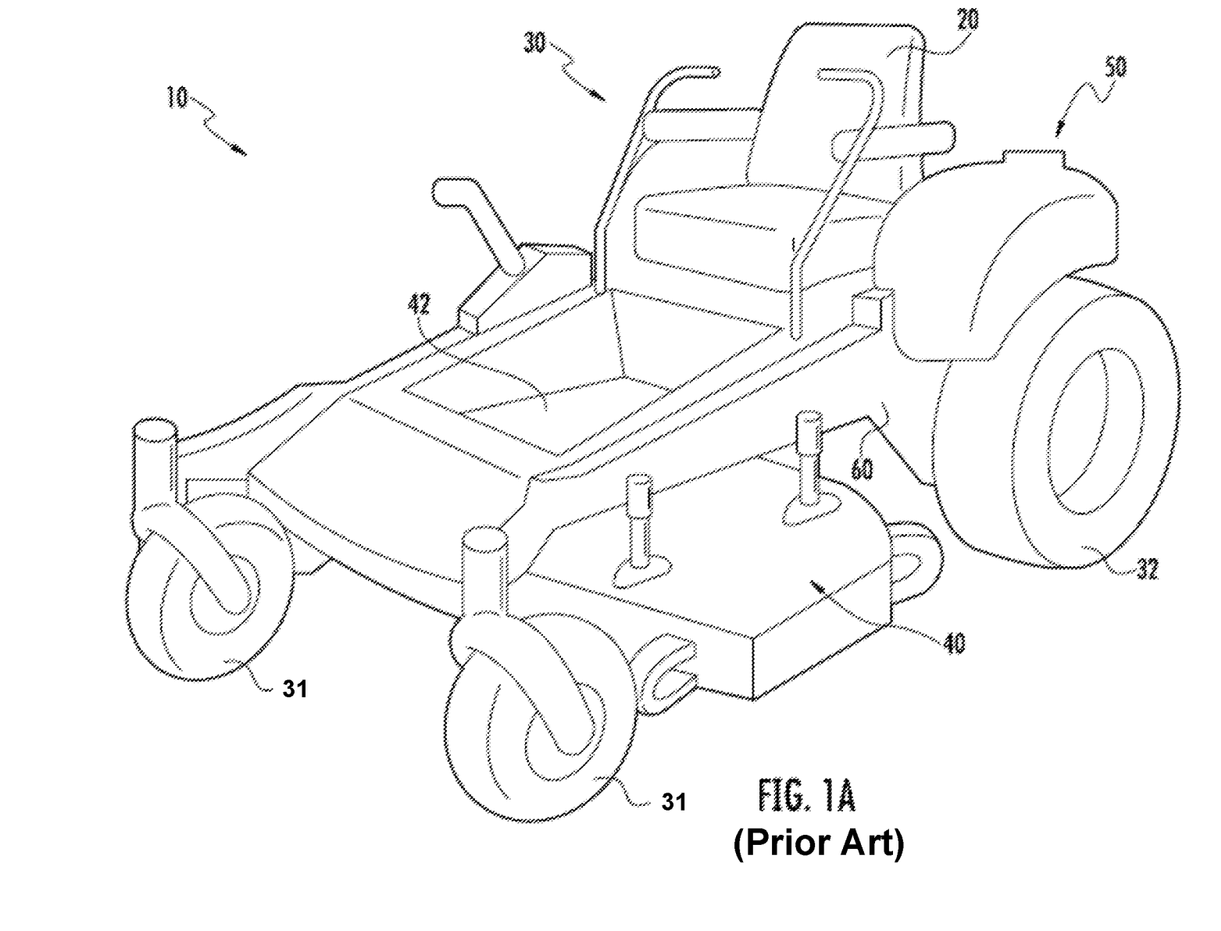
FIG. 1A illustrates a perspective view of a conventional riding lawn care vehicle.
Figure 1B:
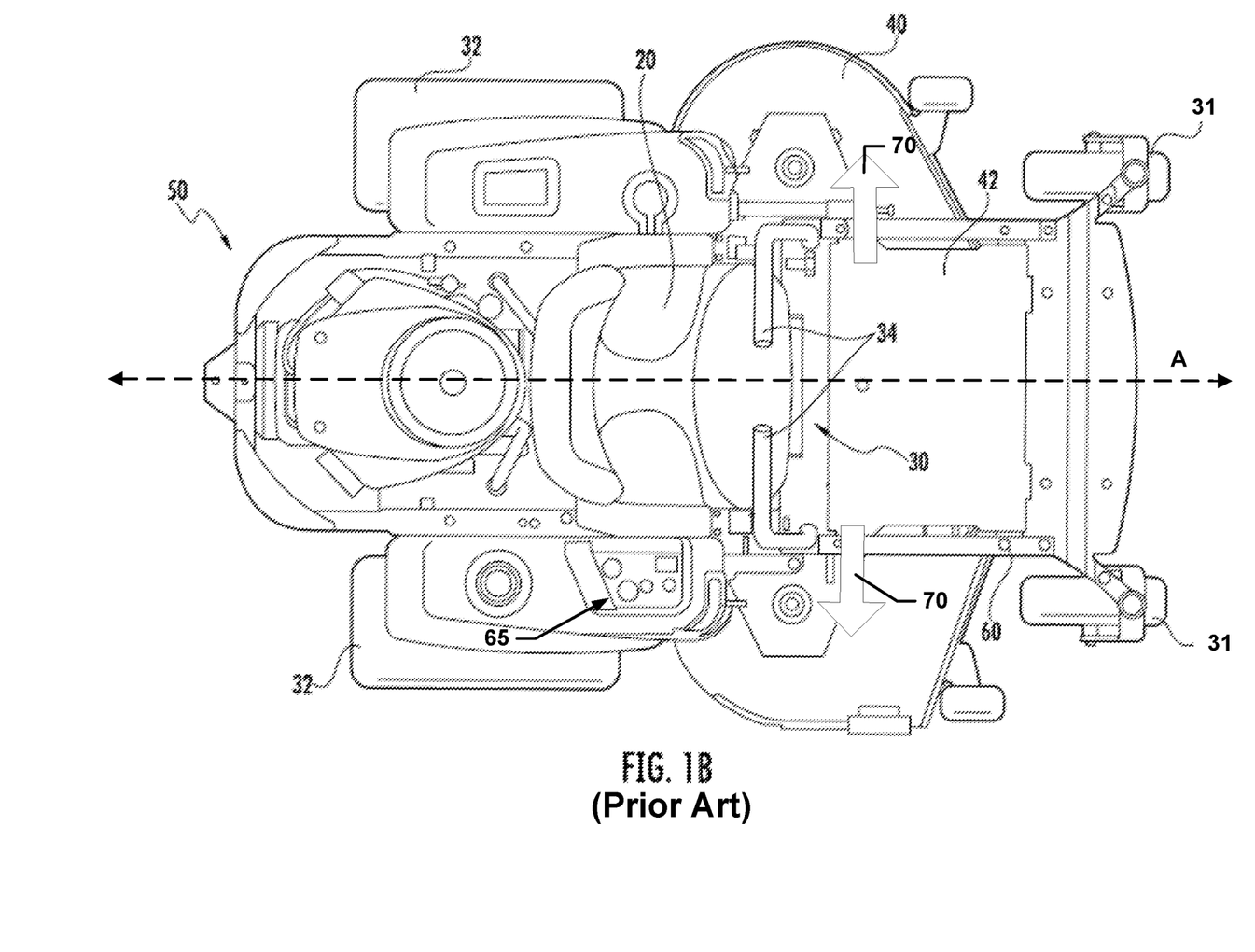
FIG. 1B illustrates a top view of the riding lawn care vehicle of FIG. 1A.

FIG. 1, which includes FIGS. 1A and 1B, illustrates a riding lawn care vehicle 10 that does not include controls of an example embodiment. In this regard, FIG. 1A illustrates a perspective view of the riding lawn care vehicle 10, and FIG. 1B illustrates a top view of the riding lawn care vehicle 10. In some embodiments, the riding lawn care vehicle 10 may include a seat 20 that may be disposed at a center, rear, or front portion of the riding lawn care vehicle 10. The riding lawn care vehicle 10 may also include a steering assembly 30 (e.g., a set of steering levers or the like) functionally connected to wheels 31 and/or 32 of the riding lawn care vehicle 10 to allow the operator to steer the riding lawn care vehicle 10.

Figure 2:
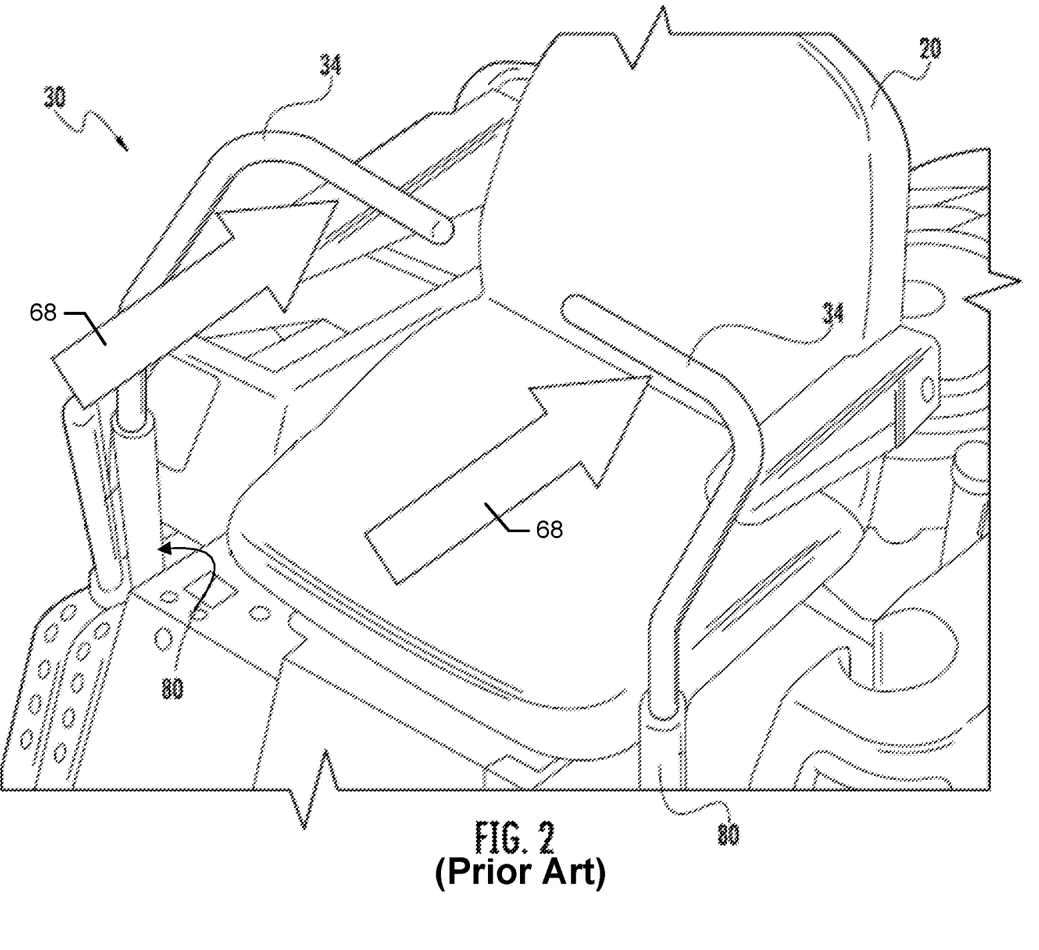
FIG. 2 illustrates a perspective view of the steering assembly of the riding lawn care vehicle of FIGS. 1A and 1B.

FIG. 2 illustrates a perspective view of a steering assembly with steering levers positioned to be pulled back for rearward propulsion of the riding lawn care vehicle 10 of FIG. 1. Referring to FIGS. 1 and 2, the operator may sit on the seat 20, which may be disposed to the rear of the steering assembly 30 to provide input for steering of the riding lawn care vehicle 10 via the steering assembly 30. However, some models may be stand-up models that eliminate the seat 20. If the seat 20 is eliminated, the operator may stand at an operator station proximate to the steering assembly 30. In some cases, the steering assembly 30 may include separately operable steering levers 34 shown specifically in FIG. 1B and FIG. 2.

The riding lawn care vehicle 10 may also include a cutting deck 40 having at least one cutting blade (e.g., three cutting blades) mounted therein. The cutting deck 40 may be positioned substantially rearward of a pair of front wheels 31 and substantially forward of a pair of rear wheels 32 in a position to enable the operator to cut grass using the cutting blade(s) when the cutting blade(s) are rotated below the cutting deck 40 when the cutting deck 40 is in a cutting position. However, in some alternative examples, the cutting deck 40 may be positioned in front of the front wheels 31. The cutting deck 40, and particularly the blade(s) therein represent an example of a work assembly that may be powered by the riding lawn care vehicle 10 to perform a given task. The riding lawn care vehicle 10 may additionally or alternatively be equipped or configured with other work assemblies some of which may be accessories (e.g., a bagger or bagging attachment, a bucket for a front loader, a snow blower attachment, etc.).

In some cases, a footrest 42 may also be positioned above the cutting deck 40 forward of the seat 20 to enable the operator to rest his or her feet thereon while seated in the seat 20. In embodiments that do not include the seat 20, the footrest 42 may form the operator station from which a standing operator controls the riding lawn care vehicle 10. When operating to cut grass, the grass clippings may be captured by a collection system, mulched, or expelled from the cutting deck 40 via either a side discharge or a rear discharge.

In the pictured example embodiment, an engine 50 of the riding lawn care vehicle 10 is disposed to the rear of a seated operator. However, in other example embodiments, the engine 50 could be in different positions such as in front of or below the operator. As shown in FIG. 1, the engine 50 may be operably coupled to one or more of the wheels 31 and/or 32 to provide drive power for the riding lawn care vehicle 10. The engine 50 may provide power for the work assembly or assemblies of the riding lawn care vehicle 10 as well. The engine 50, the steering assembly 30, the cutting deck 40, the seat 20, and other components of the riding lawn care vehicle 10 may be operably connected (directly or indirectly) to a frame 60 of the riding lawn care vehicle 10. The frame 60 may be a rigid structure configured to provide support, connectivity, and/or interoperability functions for various ones of the components of the riding lawn care vehicle 10.

As shown in FIG. 1B, the riding lawn care vehicle 10 may include a console 65 that may be located alongside the seat 20 (on one side or the other thereof). The console 65 may include one or more controls for various functional components of the riding lawn care vehicle 10. For example, some of the controls that may be included at the console 65 may include controls for adjusting blade speed (including turning blade rotation on/off), adjusting cutting deck 40 height, applying brakes, operating lights, turning the engine 50 on/off, etc. The console 65 may also include one or more notification means or devices such as fuel status indicators, battery status indicators, and/or the like.

In some example embodiments, the steering assembly 30 may be embodied as an assembly of metallic and/or other rigid components that may be welded, bolted, and/or otherwise attached to each other and operably coupled to the wheels of the riding lawn care vehicle 10 to which steering inputs are provided (e.g., rear wheels 32). For example, the steering assembly 30 may include or otherwise be coupled with hydraulic or electric motors that independently power one or more drive wheels (e.g., rear wheels 32) on each respective side of the riding lawn care vehicle 10. The steering levers 34 may be operable to move forward (i.e., in a direction opposite arrow 68 in FIG. 2) and rearward (i.e., in the direction shown by arrow 68 in FIG. 2) while in the inboard position (shown in both FIGS. 1 and 2).

When a steering lever 34 is pushed forward (e.g., away from the operator an opposite the direction of arrow 68), the corresponding hydraulic motor may drive the corresponding wheel forward. When a steering lever 34 is pulled rearward (e.g., toward the operator as shown by the direction of arrows 68 in FIG. 2), the corresponding hydraulic motor may drive the corresponding wheel backward. Thus, when both steering levers 34 are pushed forward the same amount, the riding lawn care vehicle 10 travels forward in substantially a straight line because approximately the same amount of forward drive input is provided to each drive wheel. When both steering levers 34 are pulled back the same amount, the riding lawn care vehicle 10 travels backward (e.g., rearward) in substantially a straight line because approximately the same amount of rearward drive input is provided to each drive wheel. When one steering lever 34 is pushed forward and the other steering lever 34 is pulled back, the riding lawn care vehicle 10 begins to turn in a circle and/or spin. Steering right and left may be accomplished by providing uneven amounts of input to the steering levers 34. Other steering control systems may be employed in some alternative embodiments.

Although the steering levers 34 are generally moved forward (i.e., opposite the direction of the arrows 68 shown in FIG. 2) or backward (i.e., in the direction of the arrows 68 shown in FIG. 2) in any desirable combination while they are in the operating positions shown in FIGS. 1 and 2, it should be appreciated that the steering levers 34 may also be moved to an outboard position (e.g., in a non-operational state) by moving the steering levers 34 outwardly in the direction shown by arrows 70 in FIG. 1B. In this regard, although the steering levers 34 are shown in the inboard (or operational) position in FIGS. 1 and 2, the steering levers 34 may be moved in the direction of arrows 70 (i.e., outboard) relative to their inboard position and into a non-operational position. In some cases, each of the steering levers 34 may be operably coupled to respective lever mounts 80 that may pivot to enable the steering levers 34 to move outwardly (e.g., to the outboard position) or inwardly (e.g., to an inboard and/or operating position). In some embodiments, when at least one (and sometimes both) of the steering levers 34 is pivoted outwardly, brakes may be applied and the operator may easily mount or dismount the riding lawn care vehicle 10 and sit in or leave the seat 20.

As noted above, it may be undesirable to have the operator either looking at the console 65 or removing a hand from one of the steering levers 34 in order to operate a control located at the console 65. In order to obviate the need for the operator to look at the console 65 or remove a hand from the steering levers 34, some example embodiments may place controls (and perhaps also notification devices) that would otherwise be at the console 65 on the steering levers 34. Moreover, as noted above, doing so in a manner that does not require completely different steering lever models or designs to be provided for different controls or for options that include or do not include such controls would also be of great benefit. Some example structures and designs that may be employed to accomplish these goals will now be described in reference to FIGS. 3-8.

Figure 3A:
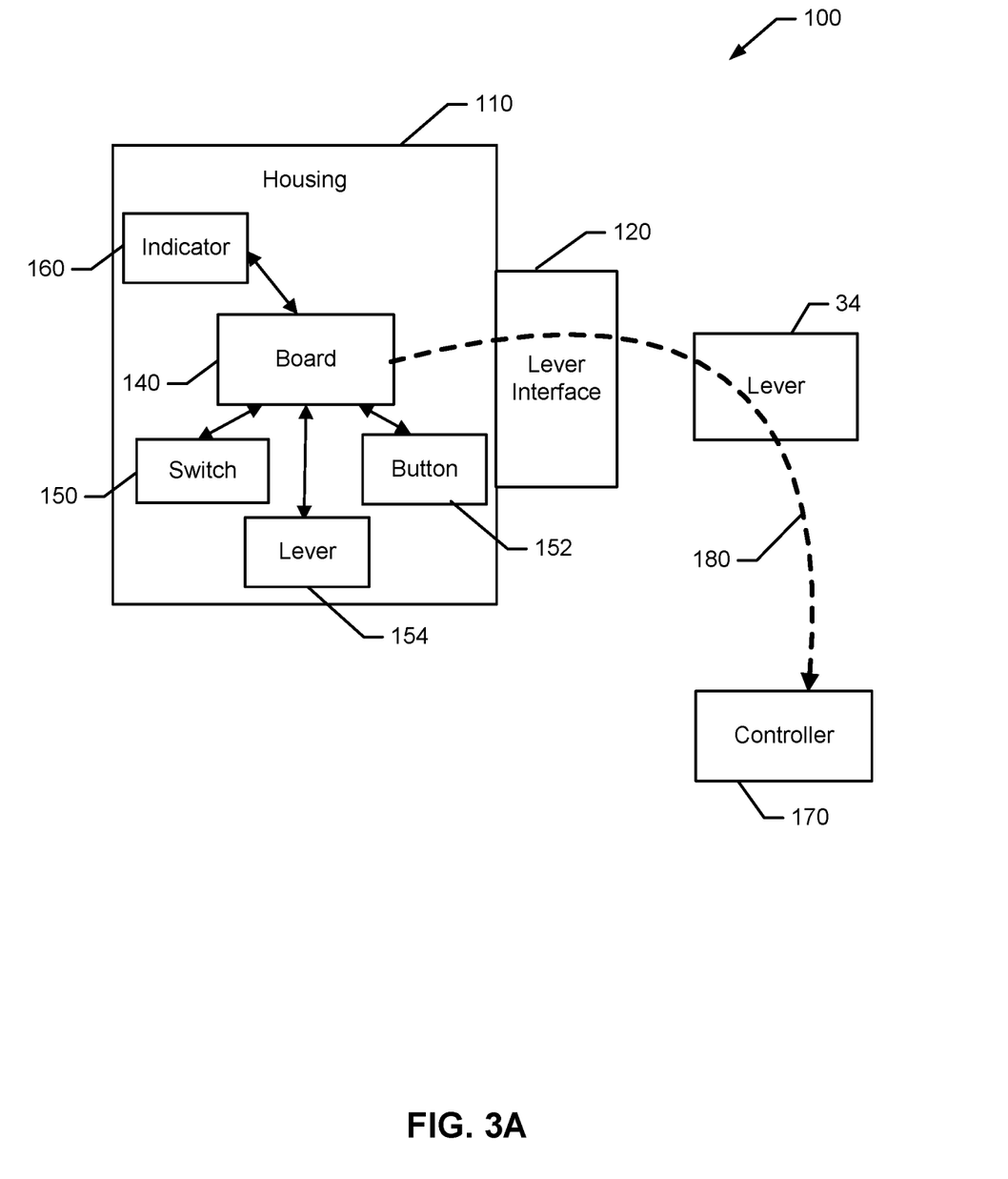
FIG. 3A illustrates a block diagram of a wired connection for a control module for providing controls on the steering lever of the riding lawn care vehicle according to an example embodiment.
Figure 3B:
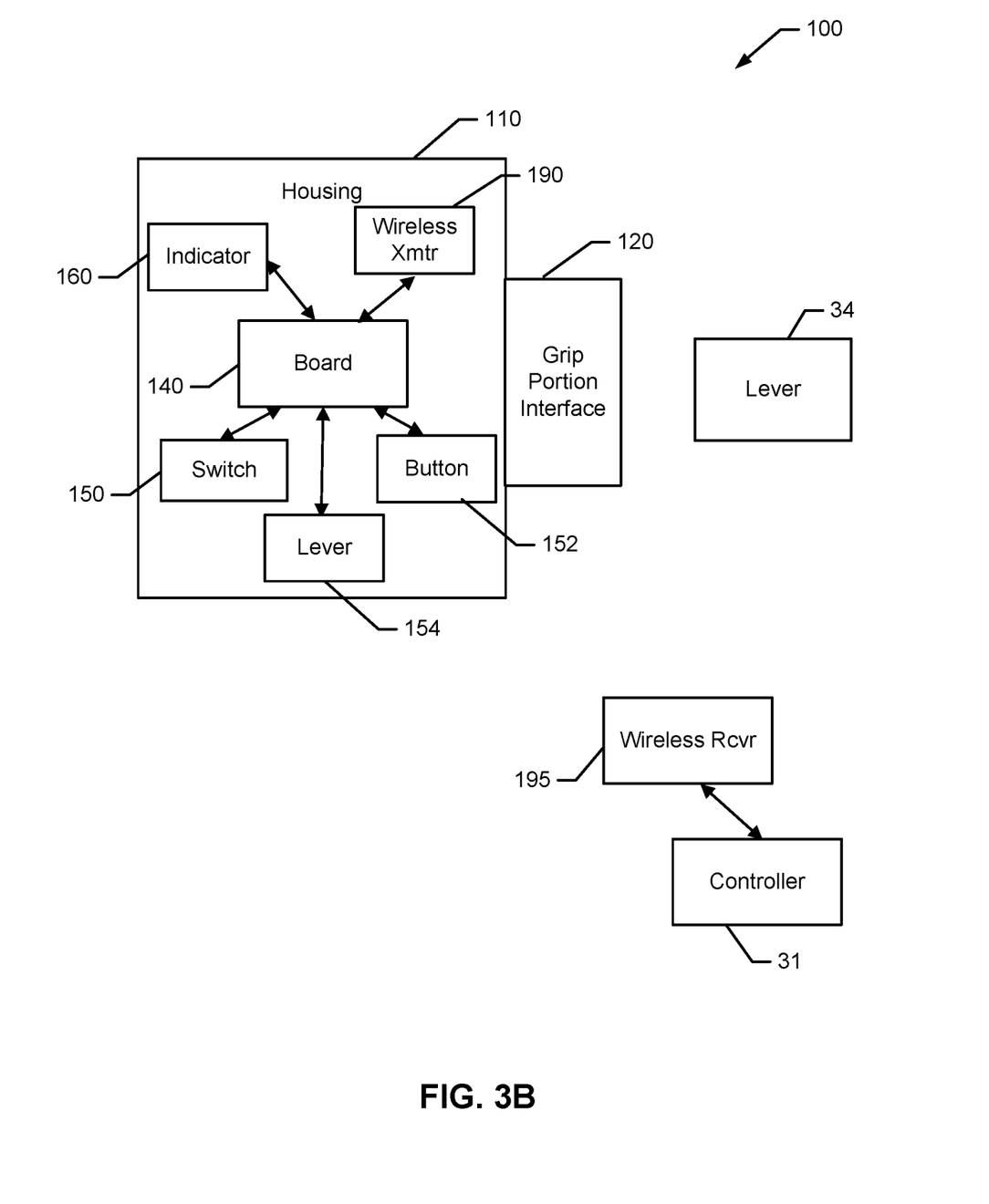
FIG. 3B illustrates a block diagram of a wireless connection for a control module for providing controls on the steering lever of the riding lawn care vehicle according to an example embodiment.

FIG. 3, which is defined by FIGS. 3A and 3B, illustrates block diagrams of two examples of how some components can be added to the riding lawn care vehicle 10 of FIGS. 1 and 2 to provide heads up controls (i.e., the ability to control the riding lawn care vehicle 10 without looking down or away from the front or the steering levers 34) in accordance with an example embodiment. The components added may be operably coupled to one or more of the steering levers 34. In particular, a control module 100 may be operably coupled to one of the steering levers 34 (or separate instances of the control module 100 may be operably coupled to each of the steering levers 34).

The control module 100 may include a housing 110 that may either include or itself be operably coupled to a lever interface 120. In other words, the housing 110 and the lever interface 120 may be integrally formed with each other (e.g., as part of one seamless structure, or as two integrated halves (e.g., front/back) that are joined together to form the control module 100). Alternatively, the housing 110 and the lever interface 120 may be separate parts that are joined together (e.g., via snap, press, interference or friction fitting, or via adhesives or fasteners). In some cases, the housing 110 and the lever interface 120 may be made of the same material (e.g., metal, plastic, resin, or other rigid materials), and each may be formed to be substantially hollow or at least have a hollow portion therein.

The lever interface 120 may slide or otherwise fit over the end (i.e., the distal end) of the steering lever 34. In some cases, the steering lever 34 may be a metallic tube (or tube made of other rigid material) that includes at least one portion that extends substantially vertically (when mounted at the neutral position), and another portion that extends substantially horizontally. The portion of the steering lever 34 that extends substantially horizontally may be considered or actually include a separate structure as a grip portion 130 or grip. In some examples, the grip portion 130 may be made of a different material (e.g., softer) that is more comfortable for an operator to grip, and may slide (like a sleeve) over all or part of the portion of the steering lever 34 that extends substantially horizontally. In some cases, the grip portion 130 may include texturing or other features that enhance or improve the ability of the operator to grip the steering lever 34. The lever interface 120 may also be operably coupled to the end of the steering lever 34 (i.e., adjacent to, but as a separate part from the grip portion 130) via snap, press, interference or friction fitting, or via adhesives or fasteners. Thus, in some cases, the lever interface 120 may abut the grip portion 130, but could otherwise be spaced apart from the grip portion 130 by a small amount. Moreover, the lever interface 120 could abut either end of the grip portion 130 (i.e., the distal end of the grip portion 130 and the steering lever 34, or a proximal end of the grip portion 130, which may be located at or near a bend in the steering lever 34).

The hollow portion of the housing 110 may house a board 140 (e.g., a circuit board) to which one or more controls (or control operators) may be operably coupled. Thus, for example, the board 140 may be operably coupled to one or more instances of one, any or all of a switch 150, a button 152 and/or a lever 154, each of which may be considered to be an example of a control operator (a physical device that is actuated by the operator to cause a corresponding control impact on the work assembly, functional component, accessory or the like that the control operator is operably coupled to and configured to control). The switch 150, the button 152, and the lever 154 shown may have binary positions (e.g., on/off). However, in other cases, particularly the switch 150 or the lever 154 may be used to define variable or discrete positions in between on/off or opposing extremes of the range of control positions available. In either case, the controls (e.g., the switch 150, the button 152 or the lever 154) may provide the physical device that enables the operator to make a selection (based on positioning or operating the corresponding one of the controls), and the board 140 may provide the circuitry for interfacing with corresponding components of the riding lawn care vehicle 10 (either directly or via other control devices) to carry out the functionalities or changes associated with the selections made. The board 140 may also, in some cases, be operably coupled to one or more instances of an indicator 160. The indicator 160 may be a gauge, light, or other visual display device that provides a visual indication of the status of a corresponding component of the riding lawn care vehicle 10 (or the vehicle itself).

In an example embodiment, the board 140 may itself include control electronics that direct operation or control of various systems or components of the riding lawn care vehicle 10 in order to make the changes that correspond to the selections made by the operator during operation of the controls. Thus, for example, the board 140 may include a controller 170 that is configured to interface with circuitry or components that control the respective functions/components of the work assembly (or accessories or other functional components). However, in other cases, the controller 170 may be located remotely with respect to the board 140, and may be in communication therewith. This may allow the controller 170 to be located at any desirable location on the riding lawn care vehicle 10. For example, the controller 170 may be operably coupled to a bus or each component individually via wired or wireless connection to control the corresponding component based on the positioning of the controls associated therewith.

In examples where the controller 170 is located remotely with respect to the board 140, the board 140 and the controller 170 may be operably coupled to each other by any suitable method. FIG. 3A illustrates an example in which there is a wired connection between the controller 170 and the board 140. In this regard, cable 180 provides the wired connection therebetween. The cable 180 may also be coupled to, or alternatively be part of, a bus via which numerous components communicate with the controller 170. Moreover, it should be appreciated that other alternative embodiments may use the cable 180 for mechanical connectivity and functionality instead of electrical. For example, the board 140 could be eliminated entirely, and mechanical movement of any of the switch 150, the button 152 or the lever 154 could be mechanically communicated to the controller 170 via the cable 180.

As an alternative to a wired connection, wireless connection between the controller 170 and the board 140 is also possible. For example, the board 140 may be operably coupled to a wireless transmitter 190, which may be collocated with the board 140 as shown in FIG. 3B. The wireless transmitter 190 may in turn be operably coupled to a wireless receiver 195 that may be remotely located with respect to the housing 110 and, in some cases, may be collocated with the controller 170. The selections made by the operator at the control module 100 may be communicated by the board 140 to the controller 170 via the wireless transmitter 190 and receiver 195, respectively. Of note, if two-way communication is desired or provided between the board 140 and the controller 170, the wireless transmitter 190 and receiver 195 may each be transceivers.

Figure 4:
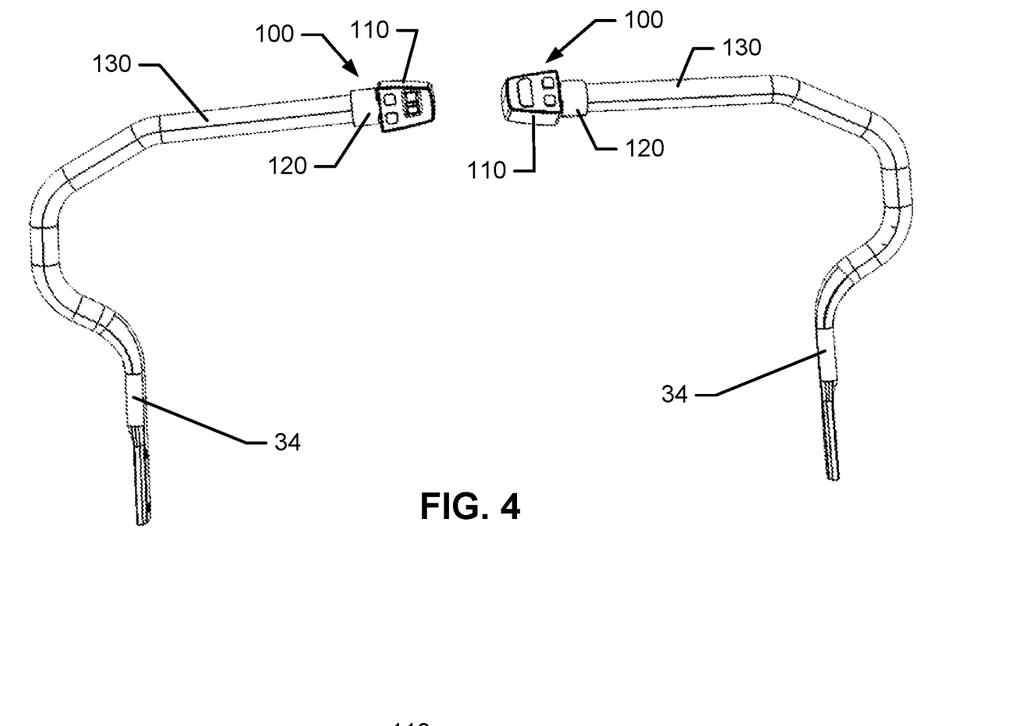
FIG. 4 illustrates a perspective view of the steering levers of the riding lawn care vehicle in isolation in accordance with an example embodiment.

FIG. 4 illustrates a perspective view of the steering levers 34 in isolation, from the perspective of the operator. In this regard, the steering levers 34 are shown with grip portions 130 provided thereon, and respective instances of the control module 100 at distal ends at each respective one of the steering levers 34. The control module 100 on each steering lever 34 is separate and distinct from the grip portions 130 so that the control module 100 can be modified, replaced, upgraded, removed or not included at all without otherwise impacting a remainder of the steering levers 34 and the grip portions 130. Although only one of the steering levers 34 may include an instance of the control module 100, the example of FIG. 4 shows each of the steering levers 34 having a respective instance of the control module 100, and each instance is slightly different. Thus, for example, the controls on each of the control modules 100 (if more than one is included) may be different, and multiple different controls (or indicators) may be provided on each one of the control modules 100.

Figure 5:
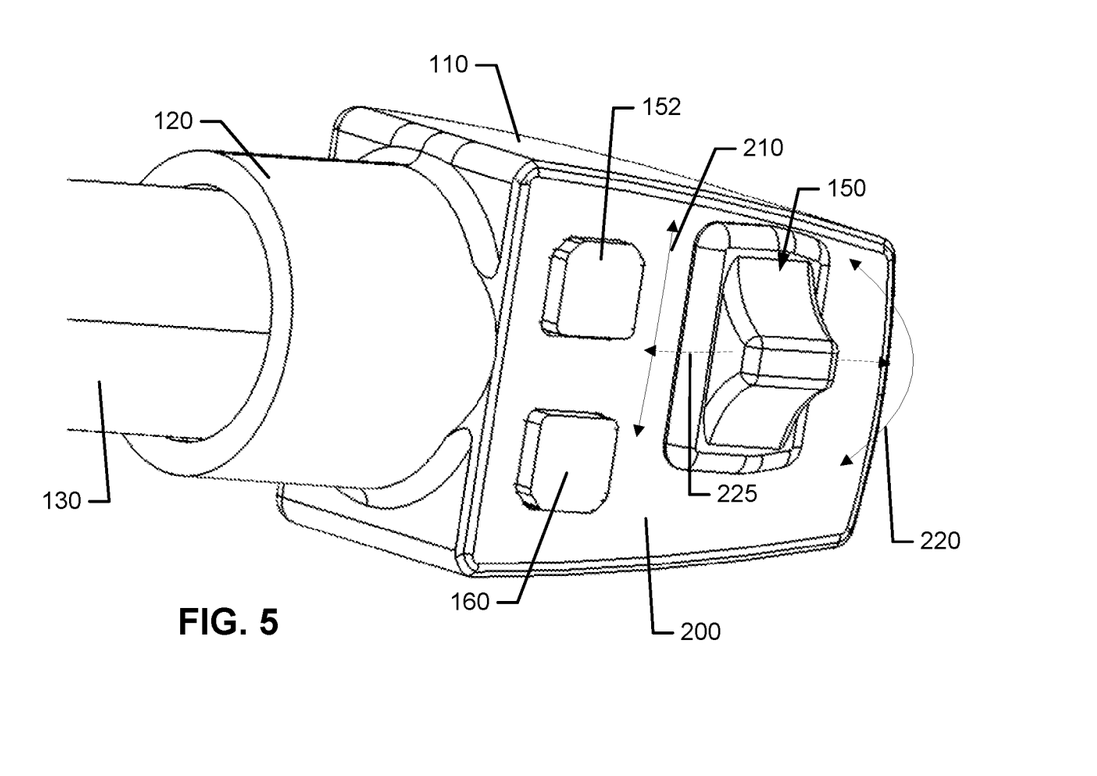
FIG. 5 illustrates a perspective view of a control module of the left steering lever of FIG. 4 in accordance with an example embodiment.
Figure 6:
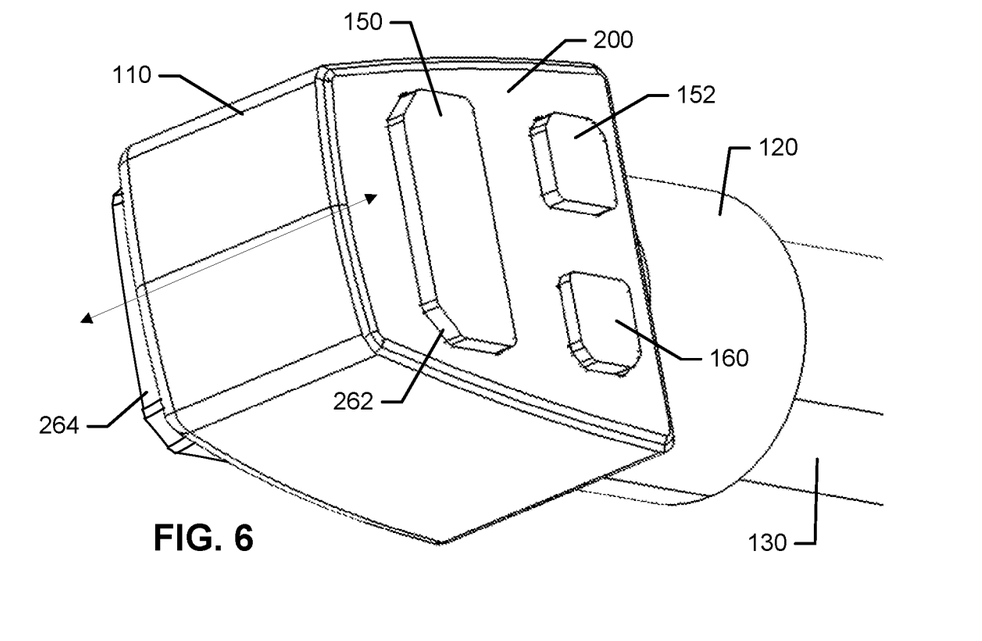
FIG. 6 illustrates a perspective view of a control module of the right steering lever of FIG. 4 in accordance with an example embodiment.

FIG. 5 illustrates one of the control modules 100 of the example of FIG. 4 in greater detail, and FIG. 6 illustrates the other one of the control modules 100 of the example of FIG. 4 in greater detail. Referring first to FIG. 5, the housing 100 has an instance of the switch 150 of FIG. 3 extending from a front face 200 of the housing 110. Moreover, all of the controls in this example are only provided on the front face 200 of the housing 110. However, it should be appreciated that other controls could be provided on other faces (e.g., the rear face, side faces, or the distal end face) of the housing 110 in alternative embodiments. In this case, the front face 220 also includes an instance of the button 152 and the indicator 160 of FIG. 3. However, each of these corresponding elements could be an instance of the button 152, or each could be an instance of the indicator 160. Moreover, additional instances of the switch 150 (for other functions) could also be included.

The button 152 of this example may be a simple push button with two positions (e.g., depressed and undepressed). When depressed, the button 152 may interact with the board 140 to generate an "on" output, and when undepressed the button 152 may interact with the board 140 to generate an "off" output. The indicator 160 may correspond to any functional component of the riding lawn care vehicle 10 and may provide status information about that functional component. In this case, the indicator 160 may simply be a light indicating power on or an on status when lit, or power off or an off status when unlit. The switch 150 may be a simple single pole switch, or may be a sliding switch that moves up or down (in the directions shown by arrow 210) relative to the front face 200 to change states. Alternatively, the switch 150 may be a rocker switch configured to rock or rotate (as shown by arrow 220 about an axis (shown by dashed line 225) to an on/actuated position or off/non-actuated position.

In some cases, the lever 154, the button 152 and/or the switch 150 may each work together relative to controlling operation of the same work assembly, component or function. For example, the button 152 may be operated to engage or disengage (enable or disable) the switch 150. As a specific example, a two-step PTO engagement/disengagement process may be controlled by first selecting the button 152 to enable the switch 150. Once the button 152 is selected or depressed, then the switch 150 may be enabled to be operated for engagement or disengagement of the PTO.

Although the switch 150 may be embodied as a slider switch or a rocker switch, as discussed above, other types of switches are also possible. For example, in FIG. 6, the switch 150 is an example of a pass through switch including a first portion 262 that may extend away from the front face 200 and be configured to be depressed toward the front face 200 thereby causing a second portion 264 to extend out a back side 266 of the housing 110 (facing opposite the front face 200). A position of the pass through switch may be determinable based on which side (i.e., the first portion 262 or the second portion 264) has more exposed material sticking out of the housing 110. For example, if the exposed amount of the first portion 262 is larger than the second portion 264, the pass through switch may be unselected or in an off position. But if the exposed amount of the second portion 264 is larger than the first portion 262, then the pass through switch may be selected, depressed, or otherwise in an on position. The pass through switch of this example may, due to the fact that the user can feel and/or see which portion is larger or has more exposed material, provide an intuitive way to determine switch position.

Figure 7:
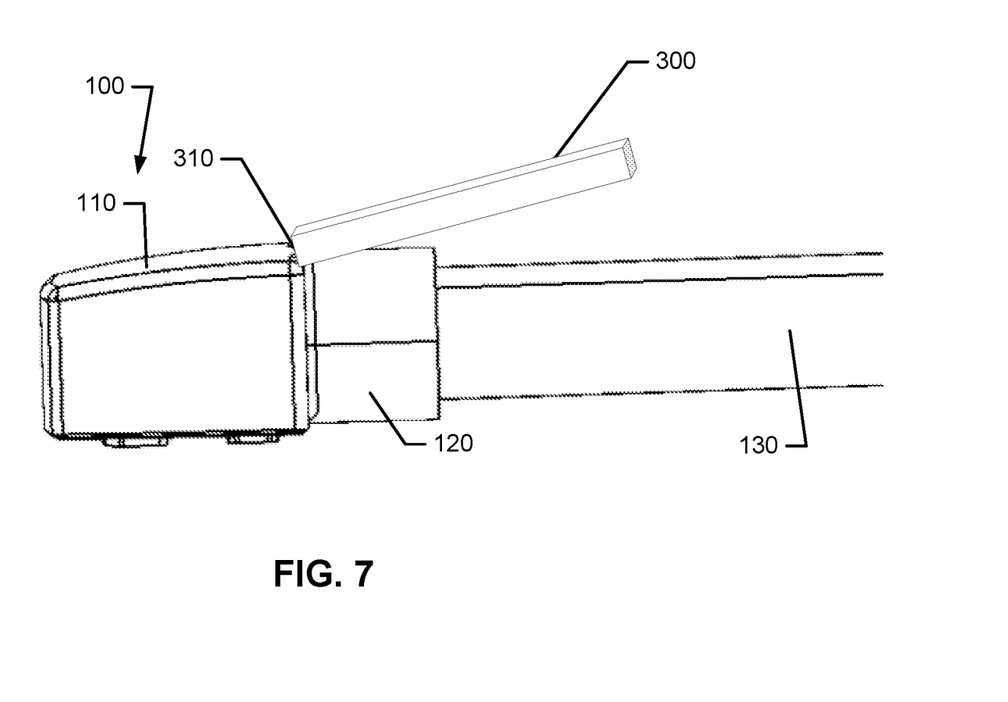
FIG. 7 illustrates a top view of a steering lever with a trigger as one of the control operators in accordance with an example embodiment.

Another example of a type of switching device that may embody the switch 150 may be a trigger 300 or other pivotable member. FIG. 7 illustrates a top view of an instance of the control module 100, which is equipped with the trigger 300. As shown in FIG. 7, the trigger 300 may be operably coupled to the housing 110 at a pivot point 310 or a hinge, and a position of the trigger 300 may be determinable between two extreme ends of a range of positions, or the trigger 300 may have binary states (actuated and non-actuated). In either case, the trigger 300 may provide an opportunity to fingers other than the thumb to be used to actuate the control operator without the operator of the riding lawn care vehicle 10 having to remove his/her hands from the corresponding one of the steering levers 34. Thus, the trigger 300 may provide a good combination of the retention of control of the steering lever 34 in combination with a heads up control operator. In a typical structure, the trigger 300 may be located on a side of the steering lever 34 that faces away from the operator. This arrangement may enable the operator to have an unobstructed view of the front face 200 (and any indicators 160 or other control operators thereon), while maintaining the ability to also operate the trigger 300.

The switch 150, the button 152, the lever 154 and the indicator 160 may each be associated with different functions and/or components or assemblies. However, in some cases, the indicator 160 may be associated with providing a status for a function, component or assembly that is operable via a corresponding one of the switch 150, the button 152, or the lever 154. The functions, components or assemblies may include, for example, power take off (PTO) operation, adjustment of blade speed, adjustment of engine revolutions per minute (RPM) or engine speed, adjustment of cutting deck height, application of a parking brake, control of vehicle lights (e.g., head lights), engine operation (on/off), and/or the like. In some cases, an instance of the switch 150 may be used to control a discharge chute (e.g., open/closed, or directional aspects thereof) or a baffle assembly (e.g., adjusting a position or arrangement of baffle components). Other functions, components and assemblies may also be controlled by the controllers. Various accessories may also be controlled using instances of the switch 150, the button 152, or the lever 154. Examples of such accessories may include control of a bucket attachment. Thus, for example, the controls may be used for bucket articulation and/or raising or lowering the bucket of a front loader.

The indicator 160 may be associated with providing status information about any of the functions, components or assemblies discussed above. However, in other cases, the indicator 160 may provide other notifications such as when there is an object immediately behind the riding lawn care vehicle 10, fuel or battery status, maintenance related information, etc. In an example embodiment, the indicator 160 may alternatively (or also) be used to indicate information about the slope on which the riding lawn care vehicle 10 is currently operating. The indicator 160 may also, in some cases, be augmented with sound so that both audio and visual warnings or indications can be provided.

Figure 8:
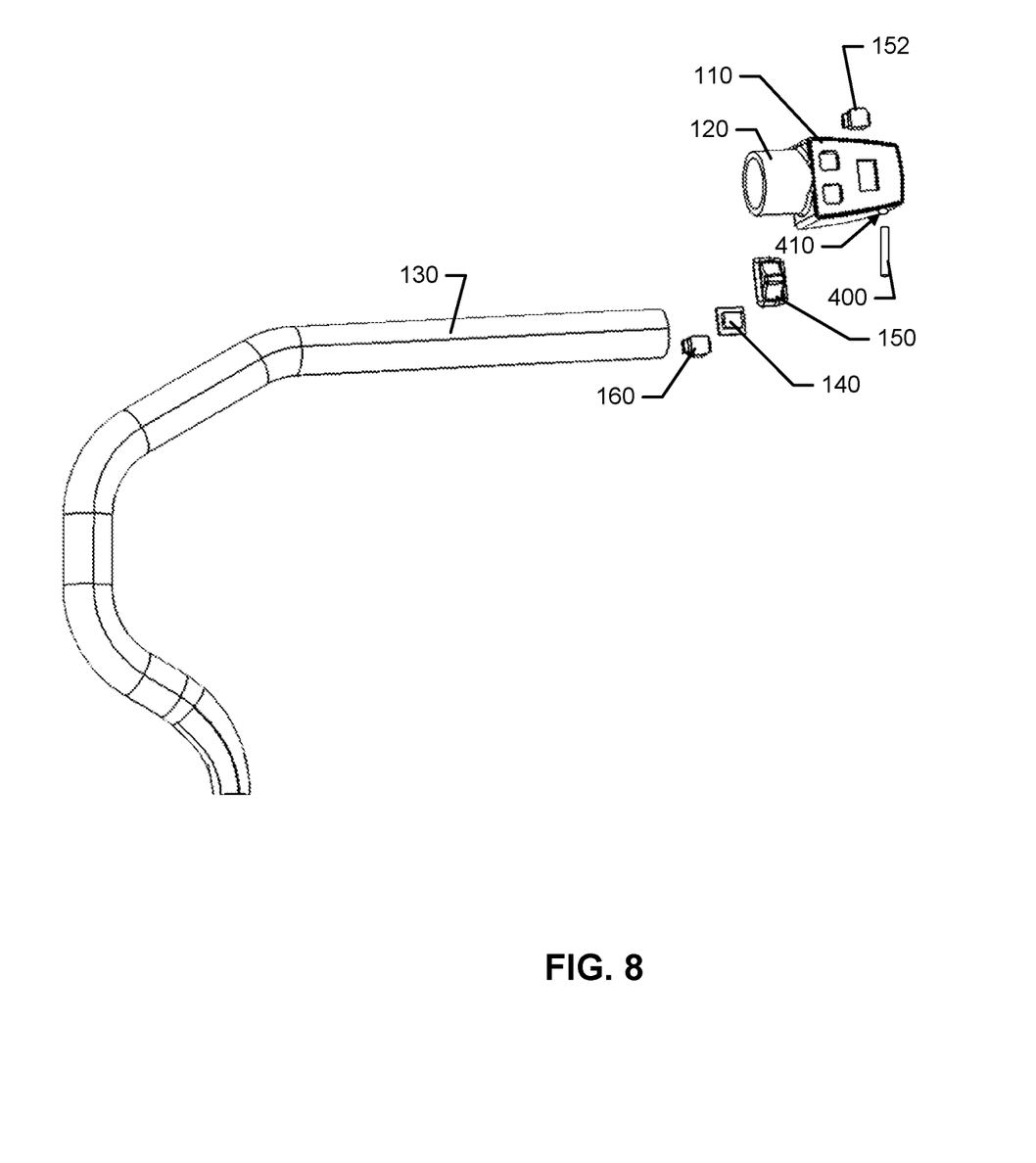
FIG. 8 illustrates an exploded view of a steering lever that also includes a key in accordance with an example embodiment.

FIG. 8 illustrates an exploded view of the control module 100 of an example embodiment. In this example, the board 140 may be directly coupled to a back portion of the switch 150. However, the board 140 could be placed at other locations in the control module 100 as well. The example of FIG. 8 also includes a modification not shown in the preceding figures. In this regard, the example of FIG. 8 illustrates an embodiment in which a key 400 is included with the control module 100. The key 400 may fit in a receptacle 410 formed in a portion of the housing 110. In an example embodiment, the key 400 may, when fully inserted into the receptacle 410 enable one of the switch 150 or the button 152 to be used to turn on the engine 50 or to turn on or enable another functional component of the riding lawn care vehicle 10. Thus, for example, the key 400 may have a physical or electrical interface with the receptacle 410 or another component associated therewith (e.g., the board 140) in order to enable the switch 150 or button 152 to be operated for starting the engine 50. However, in other cases, the key 400 may directly interface with the engine 50 for starting.

In an example embodiment, the operator can place his/her hands comfortably on the grip portion 130 of the steering levers 34 to operate the riding lawn care vehicle 10. Meanwhile, any of the instances of the switch 150, the button 152, or the lever 154 can be operated without looking away from the immediate surroundings and corresponding normal operating field of view of the operator (i.e., in front) of the riding lawn care vehicle 10. Moreover, in some cases, the operator may simply use his/her thumb to operate an instance of the switch 150, the button 152, or the lever 154 without even removing his/her hand from the corresponding one of the steering levers 34. Thus, both positive control of the steering levers 34 and full attention to the immediate surroundings can be maintained. However, even when the operator uses the index finger or another finger to operate an instance of the switch 150, the button 152, or the lever 154, the result is still more comfortable, easier and safer than looking away to find controls at a console.

Accordingly, some example embodiments may provide a riding lawn care vehicle. The riding lawn care vehicle may include a frame to which at least a first drive wheel and a second drive wheel of the riding lawn care vehicle are attachable, an engine operably coupled to the frame and the first and second drive wheels to provide power to the first and second drive wheels, a steering assembly that includes a first steering lever and a second steering lever, and a work assembly. The first and second steering levers may be operably coupled to the first and second drive wheels respectively to facilitate turning of the riding lawn care vehicle based on drive speed control of the first and second drive wheels responsive to positioning of the first and second steering levers. The work assembly may be operably coupled to the engine to perform a work function responsive to power received from the engine. Each of the first and second steering levers may include a grip portion. At least one of the first steering lever or the second steering lever may include a control module disposed proximate to and separate from the grip portion. The control module may include a control operator configured to control operation of the engine or the work assembly.

The riding lawn care vehicle (or the control module) of some embodiments may include additional, optional features, and/or the features described above may be modified or augmented. Some examples of modifications, optional features and augmentations are described below. It should be appreciated that the modifications, optional features and augmentations listed below may each be added alone, or they may be added cumulatively in any desirable combination. For example, in some embodiments, the control module may include a housing and a lever interface. The lever interface may be configured to be secured to the distal end of the first steering lever or the second steering lever proximate to the grip portion. The lever interface and the grip portion may be made of different materials. In an example embodiment, the lever interface and the distal end of the first steering lever or the second steering lever may be joined together via a snap, press, interference or friction fitting, or via adhesives or fasteners. In some cases, both the first steering lever and the second steering lever may include respective instances of the control module. In an example embodiment, the control operator may include at least one of a switch, a button or a lever. In some cases, the switch may be a rocker switch, a sliding switch or a pass through switch. In an example embodiment, the control operator may be configured to define binary states relative to control of the work assembly. In some cases, the control operator may be configured to define variable or discrete positions in between opposing extremes of a range of control positions for controlling the work assembly. In an example embodiment, the control operator may be operably coupled to a board located in the housing, and the board may be operably coupled to an electronic controller configured to interface with circuitry or components that control a respective function or component of the work assembly. In some cases, the controller may be located remotely with respect to the board and the housing, and the controller may be operably coupled to the board via a wired or wireless connection. In an example embodiment, the control operator controls operation of a power-take-off function, a parking brake, deck height control, blade speed, lights, discharge chute orientation, baffle operation, or engine status. In some cases, the riding lawn care vehicle may be a zero turn mower.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits, or solutions to problems are described herein, it should be appreciated that such advantages, benefits, and/or solutions may be applicable to some example embodiments, but not necessarily all example embodiments. Thus, any advantages, benefits, or solutions described herein should not be thought of as being critical, required, or essential to all embodiments or to that which is claimed herein. Although specific terms are employed herein, they are used in a generic and descriptive sense only and not for purposes of limitation.

That which is claimed:

1. A riding lawn care vehicle comprising:
   a frame to which at least a first drive wheel and a second drive wheel of the riding lawn care vehicle are attachable;
   an engine operably coupled to the frame and the first and second drive wheels to provide power to the first and second drive wheels;
   a steering assembly comprising a first steering lever and a second steering lever, wherein the first and second steering levers are operably coupled to the first and second drive wheels respectively to facilitate turning of the riding lawn care vehicle based on drive speed control of the first and second drive wheels responsive to positioning of the first and second steering levers; and
   a work assembly operably coupled to the engine to perform a work function responsive to power received from the engine,
   wherein each of the first and second steering levers includes a grip portion,
   wherein at least one of the first steering lever or the second steering lever is operably coupled to a control module disposed proximate to and separate from the grip portion, the control module being externally mounted on the first steering lever or the second steering lever,
   wherein the control module comprises a control operator configured to control operation of the engine or the work assembly,
   wherein the first and second steering levers are independently pivotable into and out of a neutral position in a forward direction and a rearward direction, both the forward direction and the rearward direction are substantially parallel to a longitudinal axis of the riding lawn care vehicle,
   wherein responsive to both the first and second steering levers being in the neutral position, the control module is incapable of being longitudinally misaligned with the grip portion of the first steering lever or the second steering lever, and
   wherein responsive to the first and second steering levers being out of the neutral position, the control module is capable of being longitudinally misaligned with the grip portion of the first steering lever or the second steering lever.

2. The riding lawn care vehicle of claim 1, wherein the control module comprises a housing and a lever interface, wherein the lever interface is configured to be secured to a distal end of the first steering lever or the second steering lever proximate to the grip portion, and
   wherein the lever interface and the grip portion are made of different materials.

3. The riding lawn care vehicle of claim 2, wherein the lever interface and the distal end of the first steering lever or the second steering lever are joined together via a snap, press, interference or friction fitting, or via adhesives or fasteners.

4. The riding lawn care vehicle of claim 2, wherein both the first steering lever and the second steering lever include respective instances of the control module.

5. The riding lawn care vehicle of claim 1, wherein the control operator comprises at least one of a switch, a button or a lever.

6. The riding lawn care vehicle of claim 5, wherein the switch comprises a rocker switch, a sliding switch or a pass through switch.

7. The riding lawn care vehicle of claim 5, wherein the control operator is configured to define binary states relative to control of the work assembly.

8. The riding lawn care vehicle of claim 5, wherein the control operator is configured to define variable or discrete positions in between opposing extremes of a range of control positions for controlling the work assembly.

9. The riding lawn care vehicle of claim 2, wherein the control operator is operably coupled to a board located in the housing, and
wherein the board is operably coupled to an electronic controller configured to interface with circuitry or components that control a respective function or component of the work assembly.

10. The riding lawn care vehicle of claim 9, wherein the controller is located remotely with respect to the board and the housing, and
wherein the controller is operably coupled to the board via a wired connection.

11. The riding lawn care vehicle of claim 9, wherein the controller is located remotely with respect to the board and the housing, and
wherein the controller is operably coupled to the board via a wireless connection.

12. The riding lawn care vehicle of claim 1, wherein the riding lawn care vehicle is a zero turn mower.

13. A control module operably coupleable to at least one of a first steering lever or a second steering lever of a riding lawn care vehicle, wherein the riding lawn care vehicle comprises first and second drive wheels operably coupled to respective ones of the first and second steering levers to facilitate turning of the riding lawn care vehicle responsive to drive speed control of the first and second drive wheels based on positioning of the first and second steering levers, respectively, each of the first and second steering levers including a grip portion, the control module comprising:
a housing; and
a lever interface operably coupled to the housing,
wherein the lever interface is configured to be secured to the first steering lever or the second steering lever separate from and proximate to the grip portion,
wherein the control module comprises a control operator configured to control operation of an engine or work assembly of the riding lawn care vehicle,
wherein the lever interface and the grip portion are made of different materials,
wherein the control module is externally mounted on the first steering lever or the second steering lever,
wherein the first and second steering levers are independently pivotable into and out of a neutral position in a forward direction and a rearward direction, both the forward direction and the rearward direction are substantially parallel to a longitudinal axis of the riding lawn care vehicle,
wherein responsive to both the first and second steering levers being in the neutral position, the control module is incapable of being longitudinally misaligned with the grip portion of the first steering lever or the second steering lever, and
wherein responsive to the first and second steering levers being out of the neutral position, the control module is capable of being longitudinally misaligned with the grip portion of the first steering lever or the second steering lever.

14. The control module of claim 13, wherein the lever interface and a distal end of the first steering lever or the second steering lever are joined together via a snap, press, interference or friction fitting, or via adhesives or fasteners.

15. The control module of claim 13, wherein the control operator comprises at least one of a switch, a button or a lever.

16. The control module of claim 15, wherein the switch comprises a rocker switch, a sliding switch or a pass through switch,
wherein the control operator is configured to define binary states relative to control of the work assembly, or
wherein the control operator is configured to define variable or discrete positions in between opposing extremes of a range of control positions for controlling the work assembly.

17. The control module of claim 13, wherein the control operator is operably coupled to a board located in the housing, and
wherein the board is operably coupled to an electronic controller configured to interface with circuitry or components that control a respective function or component of the work assembly.

18. The control module of claim 17, wherein the controller is located remotely with respect to the board and the housing, and
wherein the controller is operably coupled to the board via a wired or wireless connection.

19. The control module of claim 13, wherein the control operator controls operation of:
a power-take-off function;
a parking brake;
deck height control;
blade speed;
lights;
discharge chute orientation;
baffle operation; or
engine status.

20. A riding lawn care vehicle comprising:
a frame to which at least a first drive wheel and a second drive wheel of the riding lawn care vehicle are attachable;
an engine operably coupled to the frame and the first and second drive wheels to provide power to the first and second drive wheels;
a steering assembly comprising a first steering lever and a second steering lever, wherein the first and second steering levers are operably coupled to the first and second drive wheels respectively to facilitate turning of the riding lawn care vehicle based on drive speed control of the first and second drive wheels responsive to positioning of the first and second steering levers; and a work assembly operably coupled to the engine to perform a work function responsive to power received from the engine, wherein each of the first and second steering levers includes a grip portion, wherein the first steering lever is operably coupled to a first control module disposed proximate to and separate from the grip portion, the first control module being externally mounted on the first steering lever, wherein the second steering lever is operably coupled to a second control module disposed proximate to and separate from the grip portion, the second control module being externally mounted on the second steering lever, wherein the first and second control modules comprise a control operator configured to control operation of the engine or the work assembly, wherein the first and second steering levers are independently pivotable into and out of a neutral position in a forward direction and a rearward direction, both the forward direction and the rearward direction are substantially parallel to a longitudinal axis of the riding lawn care vehicle, wherein responsive to both the first and second steering levers being in the neutral position, the first control module of the first steering lever is incapable of being longitudinally misaligned with the second control module of the second steering lever, and wherein responsive to the first and second steering levers being out of the neutral position, the first control module of the first steering lever is capable of being longitudinally misaligned with the second control module of the second steering lever.

* * * * *